(12) United States Patent
Abrol et al.

(10) Patent No.: US 7,068,669 B2
(45) Date of Patent: Jun. 27, 2006

(54) METHOD AND APPARATUS FOR MAINTAINING IP CONNECTIVITY WITH A RADIO NETWORK

(75) Inventors: Nischal Abrol, San Diego, CA (US); Marcello Lioy, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1153 days.

(21) Appl. No.: 09/839,429

(22) Filed: Apr. 20, 2001

(65) Prior Publication Data

US 2002/0154627 A1    Oct. 24, 2002

(51) Int. Cl.
*H04L 12/56* (2006.01)
(52) U.S. Cl. .................. 370/401; 370/331; 455/436; 709/220
(58) Field of Classification Search ............. 370/328, 370/329, 278, 331, 338, 335, 475, 352–356, 370/400, 401, 389; 709/227, 217, 223, 220; 455/432, 436, 422, 445
See application file for complete search history.

(56) References Cited

U.S. PATENT DOCUMENTS

| | | | |
|---|---|---|---|
| 4,901,307 A | 2/1990 | Gilhousen et al. | 370/320 |
| 5,103,459 A | 4/1992 | Gilhousen et al. | 370/206 |
| 5,572,528 A | 11/1996 | Shuen | 370/402 |
| 6,201,962 B1 | 3/2001 | Sturniolo et al. | 455/432.2 |
| 6,894,994 B1* | 5/2005 | Grob et al. | 370/335 |
| 2001/0030977 A1* | 10/2001 | May | 370/475 |
| 2005/0198199 A1* | 9/2005 | Dowling | 709/217 |

OTHER PUBLICATIONS

3rd Generation Partnership Project 2 "3GPP2", *Wireless IP Network Standard*, Version 1.0, Version Date: Dec. 10, 1999, pp. 1-50.

* cited by examiner

*Primary Examiner*—John Pezzlo
(74) *Attorney, Agent, or Firm*—Philip R. Wadsworth; Thien T. Nguyen; Rupit Patel (57) ABSTRACT

Techniques to maintain an IP session established via a first (e.g., HDR) radio network while being tuned to a second (e.g., cdma2000) radio network. During registration, configuration, and session establishment with the first and second radio networks, an access terminal may be respectively assigned first and second IP addresses for use during these sessions. If the access terminal leaves the first radio network, it can request that the IP session be maintained and provides a forwarding address. Thereafter, if the first radio network has data for the access terminal, it sends a "spoof" packet to the access terminal using the forwarding address. The spoof packet can indicate that there is data available for the access terminal. Upon receiving a communication (e.g., a page) from the second radio network in response to the spoof packet, the access terminal establishes a connection with the first radio network and receives the data.

32 Claims, 6 Drawing Sheets

METHOD AND APPARATUS FOR MAINTAINING IP CONNECTIVITY WITH A RADIO NETWORK

BACKGROUND

I. Field

The present invention relates to data communication. More particularly, the present invention relates to a novel and improved method and apparatus for maintaining an Internet Protocol (IP) session with a radio network while not tuned to the radio network.

II. Background

The explosive growth of computer networks, such as the Internet, has spawned demands for high data rate infrastructures that can support the enormous amount of data traffic generated by these networks. Approximately concurrent with the growth of the Internet is the deployment and acceptance of wireless communication systems capable of supporting a variety of applications. However, earlier generations of wireless communication systems are generally designed for voice communication and may not be as efficient at transmitting data traffic generated by the Internet.

An example of such earlier generation wireless communication systems is a code division multiple access (CDMA) system disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990, and U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992. A newer generation CDMA communication system designed to efficiently transmit packet data is disclosed in U.S. Pat. No. 6,574,211, entitled "METHOD AND APPARATUS FOR HIGH RATE PACKET DATA TRANSMISSION," issued Jun. 3, 2003 (hereinafter, the HDR system). These patents and patent application are assigned to the assignee of the present invention and incorporated herein by reference.

CDMA systems are typically designed to conform to one or more CDMA standards. Examples of such CDMA standards include: (1) the "TIA/EIA/IS-95-B Mobile Station-Base Station Compatibility Standard for Wideband Spread Spectrum Cellular Systems" (hereinafter, the IS-95 standard); (2) the TIA/EIA/IS-98-A, -B, -C, and -D standards entitled "Recommended Minimum Performance Standard for Dual-Mode Spread Spectrum Cellular and PCS Mobile Stations" (hereinafter, the IS-98 standard); (3) the standard offered by a consortium named "3rd Generation Partnership Project 2" (3GPP2) and embodied in a set of documents including Document Nos. C.S0002-A, C.S0005-A, C.S0010-A, C.S0011-A. C.S0024, and C.S0026 (hereinafter, the cdma2000 standard); and (4) the standard offered by a consortium named "$3^{rd}$ Generation Partnership Project" (3GPP) and embodied in a set of documents including Document Nos. 3G TS 25.211, 3G TS 25.212, 3G TS 25.213, and 3G TS 25.214 (hereinafter, the W-CDMA standard). The HDR system can be designed to conform to the specifications defined in a document entitled "TIE/EIA/IS-856 cdma2000 High Rate Packet Data Air Interface Specification," (hereinafter, the HDR Specification). The standards are incorporated herein by reference.

Given the ever-growing demands for wireless data communication for a variety of applications, multiple radio networks may be concurrently deployed to cover a particular geographic area. In such overlay deployments, one radio network (e.g., a cdma2000 CDMA radio network) may be deployed to provide voice, data, paging, and other services, and another radio network (e.g., an HDR radio network) may be deployed to provide packet data services. These radio networks may interact via a network interface, such as the one defined by the "Inter-operability Specification (IOS) for cdma2000 Access Network Interfaces" (hereinafter, the Inter-operability Specification), which is incorporated herein by reference.

A multi-mode access terminal can be designed with the capability to communicate with multiple radio networks for various types of services. For such designs, the access terminal may initiate an Internet Protocol (IP) session with the HDR radio network for data services and may thereafter initiate another session with a CDMA radio network (e.g., one that conforms to cdma2000, W-CDMA, or some other standard) to receive voice, paging, or other services. For enhanced services, it is desirable for the access terminal to be able to maintain IP connectivity even if it moves between the HDR and CDMA radio networks.

Thus, techniques to efficiently maintain IP connectivity in overlay deployments of multiple (e.g., HDR and cdma2000) radio networks are highly desirable. It is also desirable that such techniques can be implemented with minimal or no changes to existing specifications and operation of the CDMA radio network.

SUMMARY

The present invention provides novel and improved techniques to maintain an Internet Protocol (IP) session that had been established via a first (e.g., HDR) radio network while an access terminal is tuned to a second (e.g., cdma2000 CDMA) radio network. During the registration, configuration, and session establishment processes with the first and second radio networks, the access terminal may be respectively assigned first and second IP addresses for use during the established sessions. Thereafter, if the access terminal leaves the first radio network, it can request that the IP session established via this network be maintained. The access terminal also provides a forwarding address, which is typically the second IP address. Thereafter, if the first radio network has data for the access terminal, its sends a "spoof" packet to the access terminal using the forwarding address. The spoof packet can indicate that there is data available for the access terminal. Upon receiving a page from the second radio network in response to the spoof packet, the access terminal establishes a connection with the first radio network and receives the data.

With certain aspects of the invention, to external network elements (e.g., a packet data serving node (PDSN), an end host, and others), the access terminal's IP address can simply be the first IP address even though the access terminal may transition back and forth between the first and second radio networks. Thus, the IP session for the access terminal can be maintained in a seamless manner even as the access terminal switches between multiple radio networks. Also, there is no overhead related to moving a PPP instance between radio networks whenever the access terminal transitions between them, since the main PPP instance is maintained via the first radio network.

The invention provides various methods, access terminals, and access points capable of implementing the methods described above. Other aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
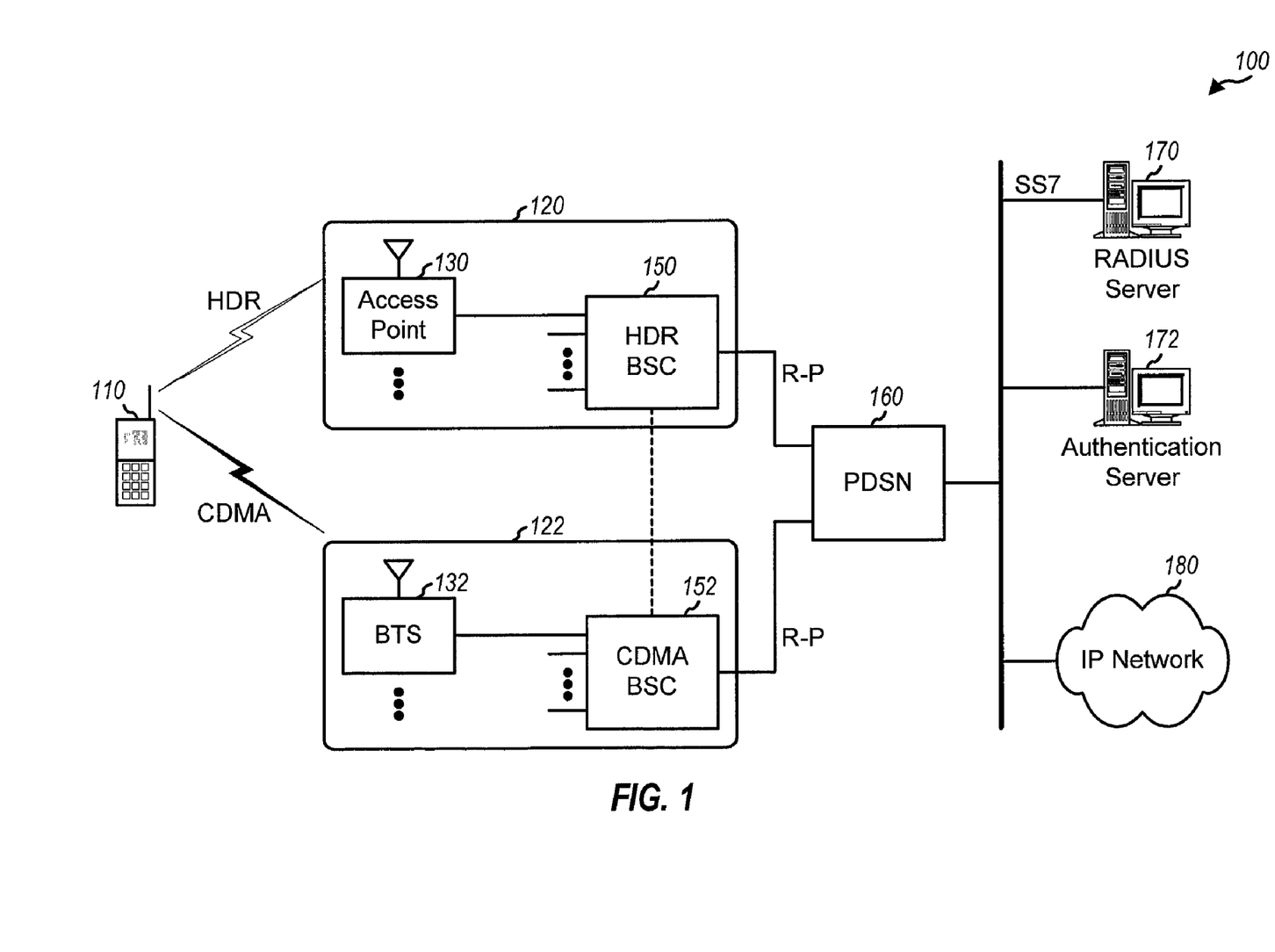
FIG. 1 is a diagram of an embodiment of a communication system that includes an HDR radio network deployed in conjunction with a CDMA radio network.

FIG. 1 is a diagram of an embodiment of a communication system 100 that includes a high data rate (HDR) radio network 120 deployed in conjunction with a wireless telephony radio network 122. HDR radio network 120 can be used to transmit packet data, and may be used to support wireless Internet services in fixed, portable, and mobile environments. HDR radio network 120 can be implemented based on the designed described in the aforementioned U.S. Pat. No. 6,574,211 and conforming to the aforementioned HDR Specification. Telephony radio network 122 can be used to support voice, data, paging, or other services, and can be a CDMA, TDMA, or GSM radio network that can conform to any particular standard(s) (e.g., IS-95, cdma2000, W-CDMA, and so on). In a specific embodiment, telephony radio network 122 is a CDMA radio network that conforms to the cdma2000 standard. For simplicity, telephony radio network 122 is hereinafter referred to as CDMA network 122.

The dual deployment and operation of the HDR and CDMA radio networks can be achieved in a manner described in U.S. Pat. No. 6,894,994, entitled "HIGH DATA RATE WIRELESS PACKET DATA COMMUNICATIONS SYSTEM," issued May 17, 2005, assigned to the assignee of the present invention, and incorporated herein by reference.

HDR radio network 120 includes a number of access points 130 that interface with a number of HDR base station controllers (HDR BSC) 150 (only one of each is shown in FIG. 1 for simplicity). Each HDR BSC 150 further couples to a packet data serving node (PDSN) 160 that supports packet data transmission. PDSN 160 can further couple to a RADIUS server 170, an authentication server 172, and an IP network 180 that may further interconnect with other networks and servers that also support packet data transmission. The PDSN and servers are described in further detail in the aforementioned U.S. Pat. No. 6,894,994.

CDMA radio network 122 includes a number of base station transceivers (BTS) 132 that interface with a number of CDMA base station controllers (CDMA BSC) 152 (again, only one of each is shown in FIG. 1 for simplicity). Each CDMA BSC 152 further couples to PDSN 160, and may further couple directly to HDR BSC 150 as indicated by the dashed line. Although not shown in FIG. 1, HDR BSC 150 can couple to one PDSN and CDMA BSC 152 can couple to another PDSN, and the PDSNs can be coupled to each other via any network. The operation of the HDR and CDMA radio networks is described in the aforementioned standards.

Access point 130 can be packaged in a separate unit that can be co-located with BTS 132. This deployment offers flexibility in allowing service providers to deploy HDR equipment from manufacturers that may not be the same as the phone network equipment providers. Alternatively, access point 130 can be integrated within BTS 132. Various deployments of the HDR and CDMA radio networks are possible and are within the scope of the invention.

For enhanced compatibility and flexibility, the functionality of HDR radio network 120 can be designed to approximately map to the functionality of CDMA radio network 122. This allows HDR radio network 120 to be integrated with CDMA radio network 122 and to couple to the same PDSN 160. The RF characteristics of the HDR radio network can also be designed to be similar to those of the CDMA radio network. This allows the HDR and CDMA radio networks to share cell sites, towers, antennas, and other system elements.

Although HDR radio network 120 can conform to the same model as CDMA radio network 122, there are typically no dependencies between these radio networks. HDR radio network 120 can thus be deployed independently from, in conjunction with, or integrated with CDMA radio network 122. Various deployments of the HDR radio network using various architectures are thus possible, some of which are described in the aforementioned U.S. Pat. No. 6,894,994.

Within communication system 100, a number of access terminals 110 (only one is shown in FIG. 1 for simplicity) communicate with access points 130 of the HDR radio network and BTS 132 of the CDMA radio network. Each access terminal 110 communicates with one or more access points 130 and/or one or more BTS 132 over a wireless link, depending on whether the access terminal is in soft hand-off and depending on whether the access terminal has registered with one or both radio networks. A multi-mode access terminal 110 may be able to receive services (e.g., voice, data, paging, and others) from either the CDMA or HDR radio network, or both (and possibly concurrently).

Access terminal 110 can be implemented in various physical embodiments such as, for example, a phone, a modem, a module, or some other units. Access terminal 110 may include a data interface that allows the access terminal to interface with other devices (e.g., a computer, an appliance, personal digital assistances (PDAs), set-top boxes, printers, and so on) via a wireless or wireline link and using various interconnection layers. In the specific example shown in FIG. 1, access terminal 110 is in communication with the CDMA radio network (as shown by the solid bolted line) and has established a session with, but is not currently tuned to, the HDR radio network (as shown by the unshaded bolted line).

Figure 2:
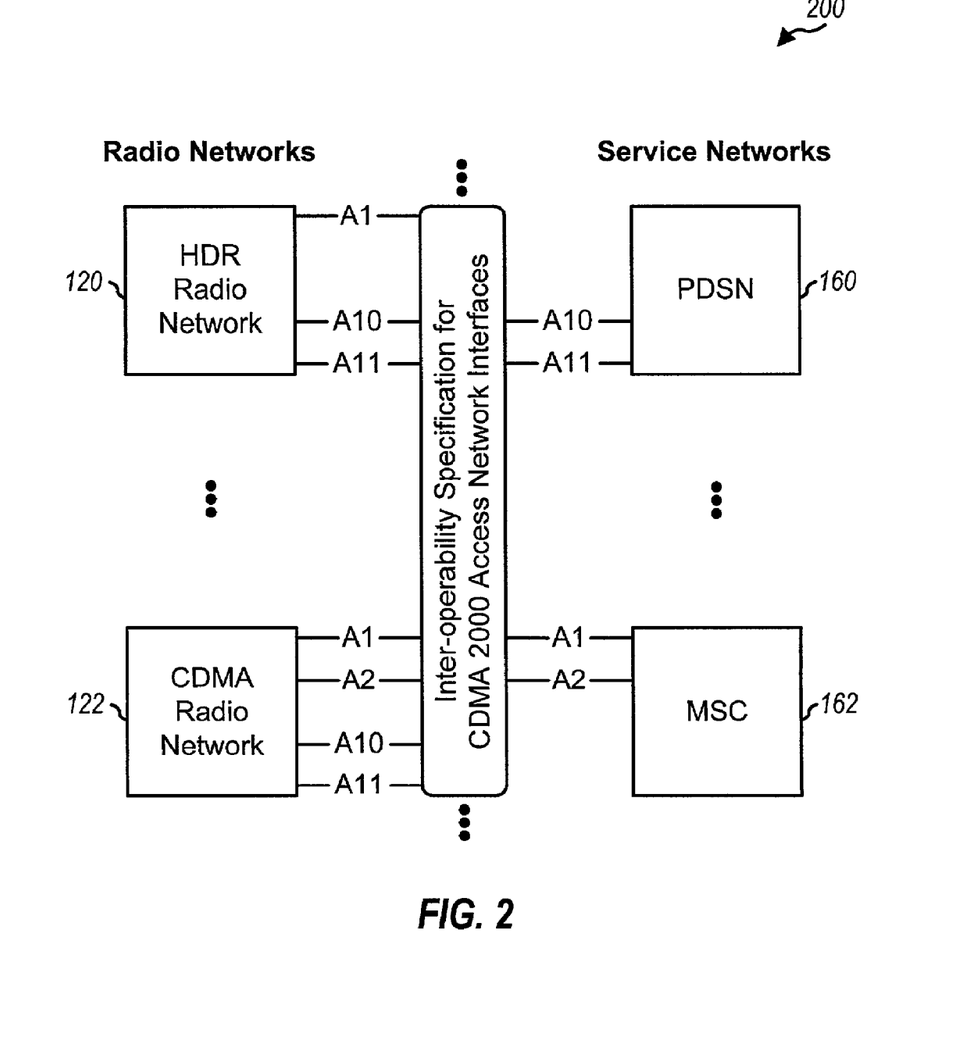
FIG. 2 is a block diagram of an access network that includes a number of radio networks interconnected to a number of service networks.

FIG. 2 is a block diagram of an access network 200 that includes a number of radio networks interconnected to a number of service networks. The radio networks can include HDR radio network 120, CDMA radio network 122, some other radio networks, or a combination thereof. The service networks can include PDSN 160, a mobile switching center (MSC) 162, some other service networks, or a combination thereof. Radio networks 120 and 122 provide radio access for the access terminals within these networks. PDSN 160 provides packet data services to the access terminals and supports functionality such as, for example, Point-to-Point Protocol (PPP), RADIUS protocol, and Mobile IP protocol. MSC 162 supports voice, data, paging, and other services and may further interconnect to a public switch telephone network (PSTN) to provide communication with conventional plain old telephones (POTs). These radio networks and service networks are further described in the aforementioned U.S. Pat. No. 6,894,994.

As shown in FIG. 2, each radio network interfaces to the service networks via one or more network interfaces defined in the aforementioned Inter-operability Specification. For packet data services, the interfaces are the PCF (packet control function) to PDSN traffic interface (A10) and the PCF to PDSN signaling interface (A11). For IS-41 and PSTN services, the interfaces are the BSC to MSC signaling interface (A1) and the BSC to MSC PCM traffic interface (A2). For example, HDR radio network 120 can interface with each of PDSN 160 and MSC 162 via the A1, A10, and A11 interfaces. Similarly, CDMA radio network 122 can interface with each of PDSN 160 and MSC 162 via the A1, A2, A10, and A11 interfaces. In particular, the interconnection between each of the HDR and CDMA BSCs and the PDSN can be achieved via a radio network-PDSN (or simply, "R-P") interface, which is part of the "A-interface" used to interconnect the radio and service networks. Referring back to FIG. 1, PDSN 160 can communicate with a number of HDR BSCs 150 and CDMA BSCs 152 via the R-P interfaces.

Figure 3:
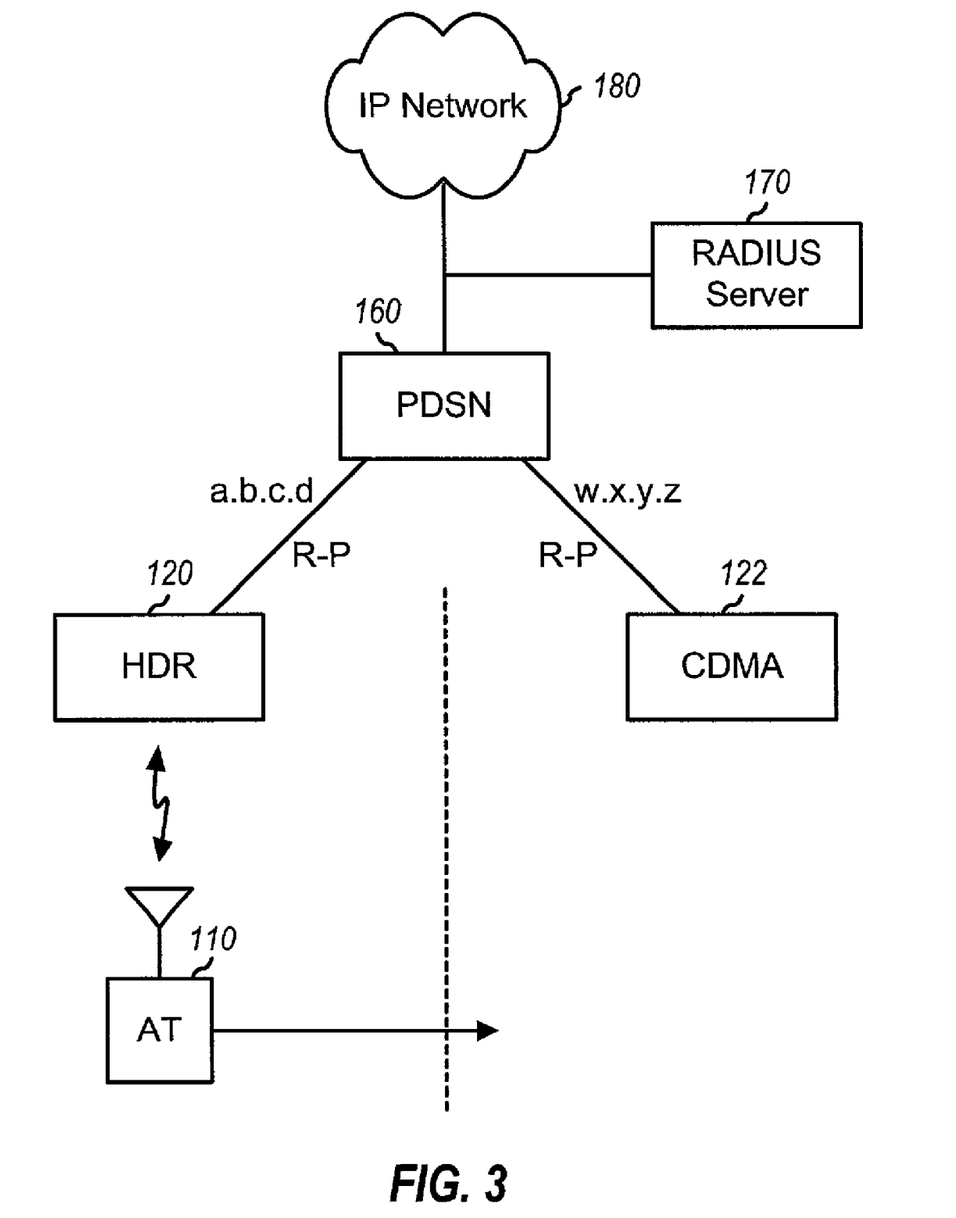
FIG. 3 is a diagram of a communication between an access terminal and the HDR and CDMA radio networks.

FIG. 3 is a diagram of a communication between access terminal 110 and the HDR and CDMA radio networks in accordance with an embodiment of the invention. Each HDR BSC 150 in the HDR radio network and each CDMA BSC 152 in the CDMA radio network is designed to cover a particular coverage area. When access terminal 110 enters the HDR radio network coverage area (i.e., the HDR registration boundary), it can initiate a registration with the HDR radio network via the particular HDR BSC 150 that covers that area.

During the registration process with the HDR radio network, which is performed the first time the access terminal comes up in that particular HDR network, the access terminal may establish a session with the radio network. Session establishment typically includes protocol negotiation, parameter negotiation, and UATI (Unicast Access Terminal Identifier) assignment. Session configuration is performed by the access terminal and HDR radio network to establish a set of protocols (at various signaling layers) to be used for subsequent communication and to establish a set of parameters to be used for each established protocol. Default protocols and/or parameters may be selected for use. Alternatively, the protocols and/or parameters may be negotiated by both entities.

The access terminal is also assigned a UATI that allows the HDR radio network to specifically identify this access terminal. As part of the session configuration, a multi-mode access terminal may send its IMSI (International Mobile Station Identification) to the HDR radio network. However, the HDR radio network may not be able to authenticate the IMSI of the access terminal. Thus, the UATI is typically used as a session identifier in place of the IMSI by the HDR radio network to identify the access terminal in subsequent communication.

The access terminal may further establish an IP session with the PDSN via the HDR radio network. During the IP session establishment (or more specifically, during PPP negotiation), the access terminal may be assigned an IP address (e.g., a.b.c.d) to be used during the session. For communication between the access terminal, HDR radio network, and PDSN, the access terminal is identified by its assigned UATI and the associated IP address.

Session establishment and configuration for the HDR radio network is described in further detail in the aforementioned HAI Specification and in U.S. Pat. No. 6,539,030, entitled "METHOD AND APPARATUS FOR PROVIDING CONFIGURABLE LAYERS AND PROTOCOLS IN A COMMUNICATIONS SYSTEM," issued Mar. 25, 2003, assigned to the assignee of the present invention, and incorporated herein by reference. IP address assignment is described in further detail in a standard adopted by the 3GPP2 standard body, entitled "Wireless IP Network Standard" (hereinafter, the Wireless IP standard), and incorporated herein by reference.

When the access terminal enters a CDMA radio network coverage area, it can similarly initiate a registration with the CDMA radio network via the particular CDMA BSC 152 that covers that area. The registration of the access terminal with the CDMA radio network can be performed in accordance with the particular CDMA standard being implemented (e.g., the cdma2000 standard). A multi-mode access terminal can typically register with the CDMA radio network even if it is tuned to the HDR radio network. For the cdma2000 CDMA radio network, the session establishment can be initiated by sending a registration message with authorization to the CDMA radio network. The registration message informs the CDMA radio network of the existence of the access terminal. After registration, the CDMA BSC can identify and track the access terminal.

In accordance with the cdma2000 standard, authentication of the access terminal is performed as part of the registration process and is achieved using the authentication fields inside the registration messages. Through the authentication, the access terminal is able to prove to the CDMA BSC that it is who it claims to be. As part of the authentication process, the access terminal generates a number (AUTHR) that only the true access terminal can generate (because only the true access terminal has the secret key). The authorization process is described in the aforementioned cdma2000 standard.

After the registration process with the CDMA radio network, the access terminal may establish another IP session with the PDSN via the CDMA radio network. In the first IP session established via the HDR radio network, the access terminal is identified by the UATI assigned by the HDR radio network because the access terminal's IMSI was not authenticated. For the second IP session established via the CDMA radio network, the access terminal is identified by its IMSI. As a result, for this second IP session, the access terminal may be assigned another IP address (e.g., w.x.y.z) for used during the session.

Two IP addresses (e.g., a.b.c.d and w.x.y.z) may thus be assigned to the access terminal for two PPP sessions with the PDSN established via the HDR and CDMA radio networks. The assignment of two IP addresses to the same access terminal results from the use of the UATI and IMSI to identify the access terminal to the PDSN. The PDSN is not aware that two IP addresses have been assigned to the same access terminal. Thus, the established PPP sessions represent two separate and independent PPP sessions with the PDSN. IP support for radio networks is described in further detail in the aforementioned Wireless IP standard.

The temporal order in which the access terminal registers with the HDR and CDMA radio networks is generally not critical. The HDR and CDMA radio network registration boundaries typically overlap, to an extent, and may be operated to be approximately aligned. The access terminal is typically able to register with whatever radio network it comes in contact (i.e., with the HDR and/or CDMA radio networks upon entering their respective coverage areas). Registration of the access terminal with a particular radio network is described in the applicable standard. Upon establishing a session with a particular radio network, the access terminal may thereafter, from time to time, establish a connection with the radio network. Via the established connection, the access terminal is able to exchange data with the radio network.

Figure 4A:
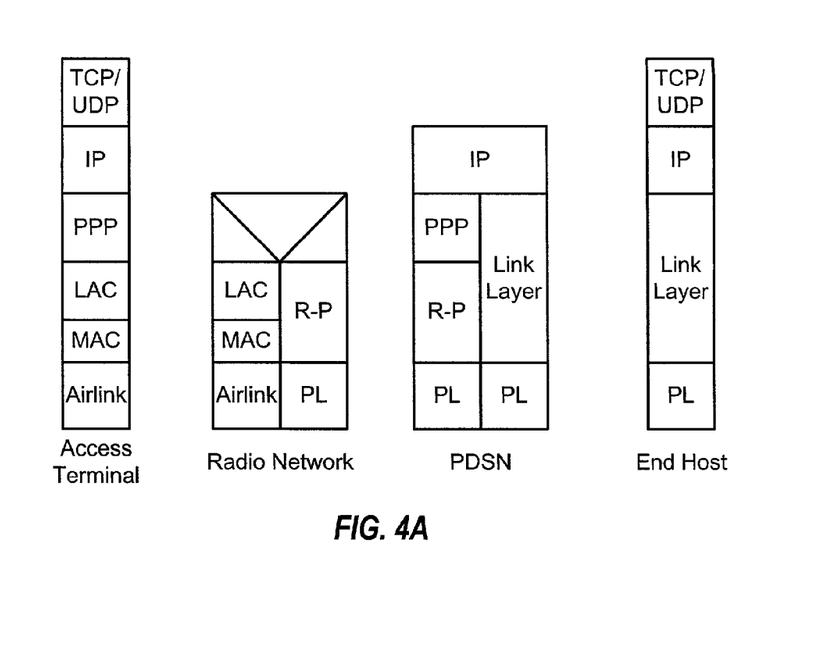
FIGS. 4A and 4B are diagrams of a protocol reference model for Simple IP and Mobile IP, respectively, in accordance with the Wireless IP Network Standard.

FIG. 4A is a diagram of a protocol reference model for Simple IP in accordance with the Wireless IP standard. As shown in FIG. 4A, the access terminal communicates with the (HDR or CDMA) radio network via the Link Access Control (LAC) protocol and the Media Access Control (MAC) protocol that operate on top of the air-link protocol. The radio network communicates with the PDSN via the R-P interference that operates on top of the physical layer (PL). The PDSN can further communicate with other network elements (e.g., an end host) via the IP protocol that operates on top of a particular link layer and physical layer. The access terminal can maintain a PPP session with the PDSN, and can further communicate with the PDSN and end host via an IP session. The access terminal and end host may exchange data via a transport layer, which may be implemented with Transmission Control Protocol (TCP), User Datagram Protocol (UDP), or some other protocol.

Figure 4B:
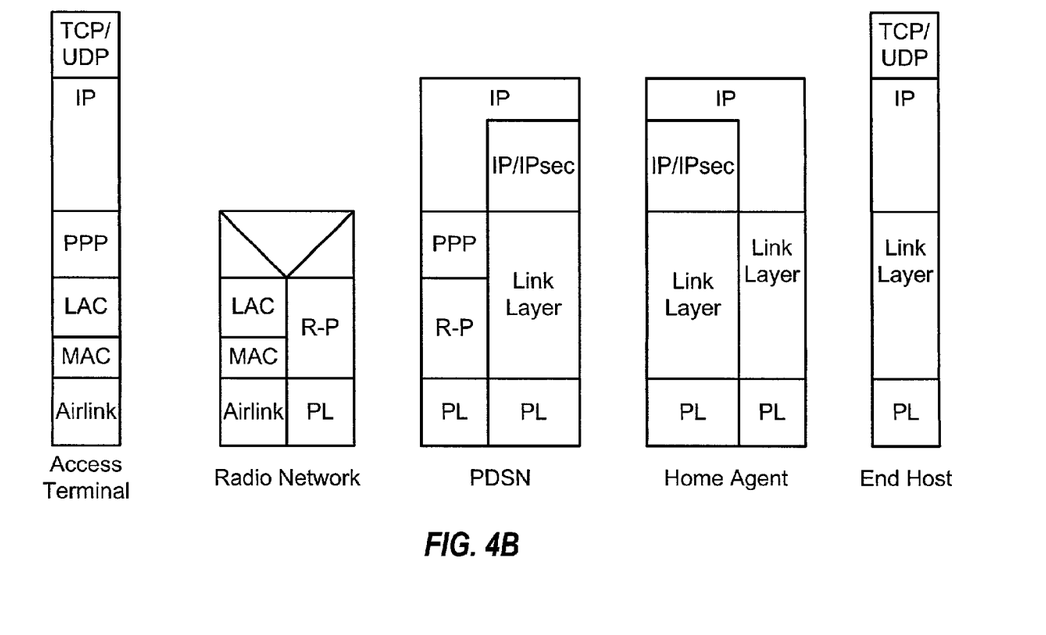

FIG. 4B is a diagram of a protocol reference model for Mobile IP in accordance with the Wireless IP standard. The model shown in FIG. 4B is similar to that shown in FIG. 4A, but includes a home agent (HA) that can communicate with the PDSN via the IP/IPsec protocol that operates on top of the link layer and physical layer. The end host communicates with the access terminal via the home agent. Although not shown in FIG. 4B for simplicity, a foreign agent (FA) may be interposed between the PDSN and home agent.

Figure 5:
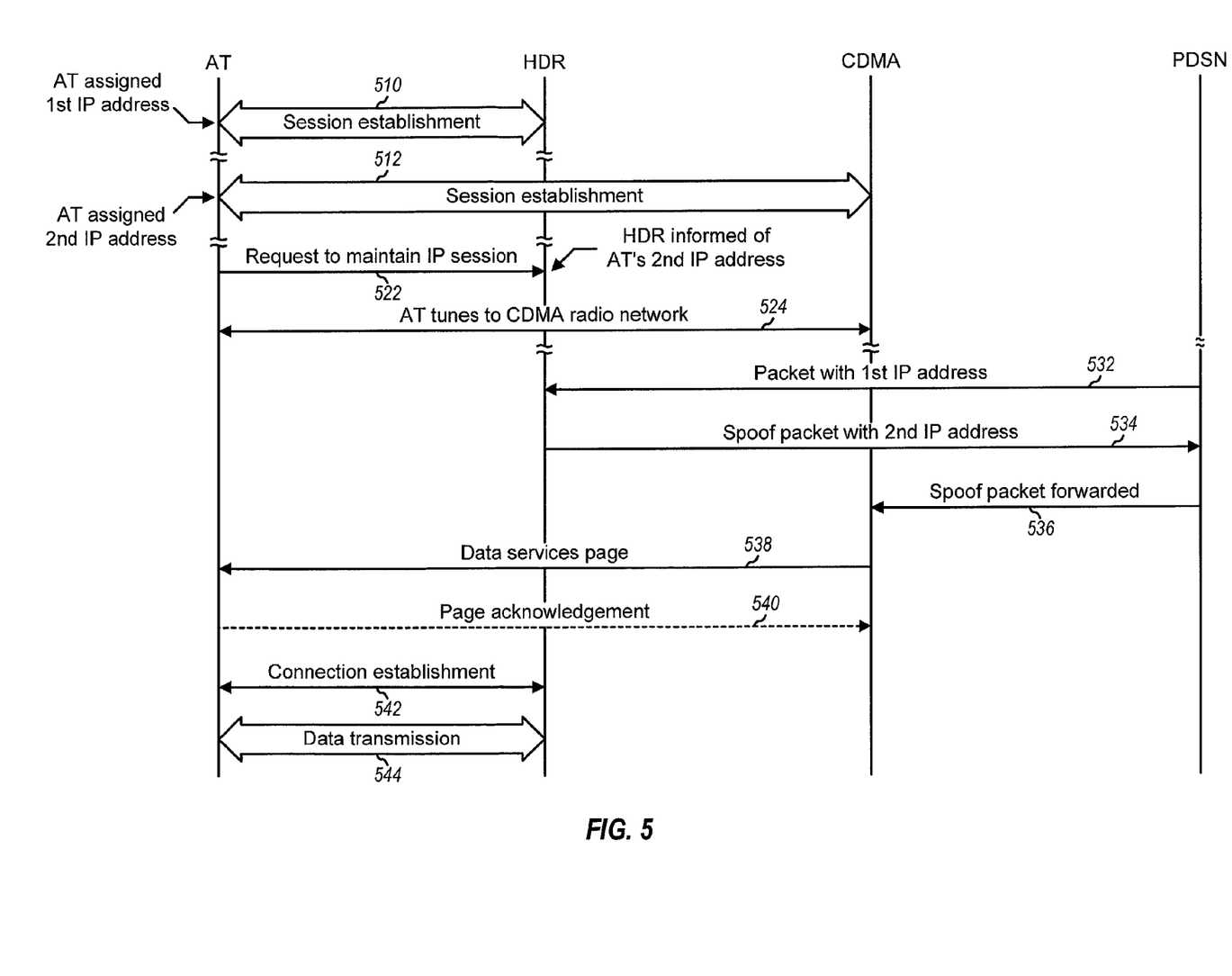
FIG. 5 is a diagram of a communication between the access terminal, radio networks, and PDSN to maintain IP connectivity for the access terminal.

FIG. 5 is a diagram of a communication between various network elements to maintain IP connectivity for an access terminal. Initially, the access terminal registers with the HDR radio network, establishes an IP session, and may be assigned an IP address (e.g., a.b.c.d) for use during the IP session, at step 510. The access terminal also registers with the CDMA radio network, establishes another IP session, and may be assigned a second IP address (e.g., w.x.y.z), at step 512.

The HDR and CDMA radio networks may each be capable of supporting an IP connection for a particular access terminal. To establish an IP connection with the CDMA radio network, a traffic channel is first established. This can be achieved via an exchange of messages between the access terminal and the CDMA radio network to select the protocols to be used and to negotiate the protocol parameters. The radio link protocol (RLP) layer between the access terminal and CDMA radio network is then synced up via control messages in the RLP (e.g., sync, sync/acknowledgment (ack), and ack. The PPP layer between the access terminal and PDSN then is synced up. This includes syncing up the link control protocol (LCP), performing authentication, and syncing up the IP control protocol (IPCP). Thereafter, data packets may be exchanged between the access terminal and the PDSN via the CDMA radio network. Establishment of an IP connection with the HDR radio network may be achieved in a similar manner.

In accordance with the invention, if the access terminal moves from the HDR radio network to the CDMA radio network, it can inform the HDR radio network that it is interested in maintaining the IP session that it has established with the HDR radio network, at step 522. The access terminal also informs the HDR radio network of its forwarding IP address (e.g., w.x.y.z). Based on this request and the forwarding information, the HDR radio network can maintain the established IP session. Thereafter, the HDR radio network can notify the access terminal (using the forwarding IP address) whenever it has data for the access terminal.

The access terminal may subsequently tune to the CDMA radio network to receive voice, data, paging, and other services, at step 524. The access terminal may move to the CDMA radio network to receive better paging service or to wait for incoming voice calls. In fact, the access terminal may move back and forth between the HDR and CDMA radio networks any number of times during a particular communication session.

While the access terminal is tuned to the CDMA radio network, the PDSN may receive a packet having the first IP address (e.g., a.b.c.d) assigned to the access terminal as the destination IP address. The PDSN would then forward the packet to the HDR radio network in the normal manner since its routing table indicates that the first IP address is associated with the HDR radio network, at step 532. The HDR radio network receives the packet, extracts the destination IP address, and recognizes that the extracted IP address belongs to an access terminal that it not tuned to the HDR radio network but has requested to maintain the IP session.

The HDR radio network then attempts to inform the access terminal that there is data available for it. In an embodiment, the HDR radio network "spoofs" an IP packet (i.e., sends a "spoof" packet) to the access terminal. The spoof packet includes the access terminal's forwarding address (e.g., the second IP address, w.x.y.z) as the destination IP address. The spoof packet may also include a message to notify the access terminal that the HDR radio network has data for it. The spoof packet is sent by the HDR radio network to the PDSN, at step 534.

The PDSN receives and processes the spoof packet, which has the appearance of, and is processed in a normal manner like, a conventional IP packet. The PDSN then forwards the spoof packet to the CDMA radio network since its routing table indicates that the second IP address is associated with this network, at step 536. The CDMA radio network receives and processes the spoof packet, and may send the packet to the access terminal. If the access terminal is dormant, the CDMA radio network can send a data services page to the access terminal (since it knows the true IMSI of the access terminal), at step 538. The access terminal receives the page and, depending on the requirements of the particular CDMA radio network, may respond to the page with a page acknowledgement, at step 540.

In response to receiving the data services page, the access terminal is able to determine that the HDR radio network has data for it and establishes a connection with the HDR radio network, at step 542. Via the connection establishment, the access terminal is assigned one or more traffic channels for use in the subsequent data exchange(s). Thereafter, the packet with the first IP address, originally forwarded from the PDSN, is sent by the HDR radio network to the access terminal, at step 544. Any number of data exchanges can occur while the access terminal has an established connection with the HDR radio network. Upon completion of the data transmission, the established connection can be tear down, as directed by either the access terminal or the HDR radio network, or automatically after a particular period of inactivity. Subsequently, the access terminal may return to the CDMA radio network and may again request that the IP session established via the HDR radio network be maintained.

In FIGS. 1 and 3, the HDR and CDMA radio networks are shown coupled to the same PDSN, which provides routing of packets. However, this is not a necessary condition. The HDR and CDMA radio networks may be coupled to two respective PDSNs. In this case, the spoof packet can be sent from the HDR radio network to the first PDSN, which then forwards the packet to the second PDSN. The second PDSN then routes the spoof packet to the CDMA radio network. Again, the spoof packet can be processed by the PDSNs and CDMA radio network in a conventional manner.

As can be seen from the above, to the PDSN and other network elements (e.g., the end hosts), the access terminal's IP address can be the first IP address (e.g., a.b.c.d) even though the access terminal may transition back and forth between the HDR and CDMA radio networks. This single IP address allows for a seamless IP session even when the access terminal switches between multiple radio networks. The second IP address (e.g., w.x.y.z) is used by the HDR radio network to forward messages to the access terminal while it is not tuned to the HDR radio network.

In an embodiment, the HDR radio network can be informed of the other radio network to which the access terminal is tuned after it leaves the HDR radio network. With this information, the HDR radio network can page the access terminal on both radio networks during a particular overlap period in which the access terminal is tuned to both radio networks.

In the embodiment described above, the access terminal sends a request to maintain the IP session and its forwarding IP address to the HDR radio network whenever it moves from the network. Thereafter, the HDR radio network sends a spoof packet whenever it has a packet for the access terminal. The request and forwarding IP address can be sent each time the access terminal leaves the HDR radio network.

In another embodiment, the HDR radio network is informed of: (1) a particular time period after which the access terminal will move to the CDMA radio network after it drops the HDR traffic channel and (2) the forwarding IP address. This information can be communicated to the HDR radio network during the session establishment or included in the (first) request to maintain the IP session. Thereafter, whenever the access terminal drops the HDR traffic channel, the HDR radio network recognizes that the access terminal has moved to the other radio network and automatically maintains the IP session. This embodiment can reduce the amount of overhead signaling needed to request the maintenance of the IP session. A "keep-alive" mechanism can be implemented to ensure that the IP session is not maintained indefinitely for the access terminal (which may have been powered down).

In an embodiment, a mechanism can be implemented to keep alive the IP session established via the HDR radio network. The keep-alive mechanism ensures that only access terminals that have indicated an interest to maintain the IP session are served in such manner. The keep-alive mechanism further ensures that IP addresses and other network resources are not unnecessarily tied up by access terminals, which may have been turned off or moved to some other radio network. Some embodiments of the keep-alive mechanism are described below.

In one embodiment of the keep-alive mechanism, the access terminal periodically sends a message to the HDR radio network requesting it to continue to maintain the IP session. The renewed request to maintain the IP session can be sent within each T1 time interval, which can be measured from the time the last request was transmitted. The HDR radio network may tear down the IP session if it does not receive the renewed request within T2 time interval. T1 and T2 can each be selected based on various parameters such as signaling delays, processing delays, and so on. As a specific example, T1 can be selected to be approximately 10 minutes, and T2 can be selected to be approximately twice T1. Other values can also be used for T1 and T2 and are within the scope of the invention.

In another embodiment of the keep-alive mechanism, the IP session is maintained for a particular time period, unless a connection is established with the access terminal. This particular time period can be provided to the HDR radio network during the session establishment, when the request is sent, or at some other time.

In the above-described embodiments, authentication of the IMSI by the HDR radio network is not required. Also, there is no overhead related to moving the PDSN PPP instance between the HDR and CDMA radio networks whenever the access terminal goes dormant, since the main PPP instance is maintained via the HDR radio network. Whenever the access terminal transitions from the HDR radio network to the CDMA radio network (e.g., after being dormant for a particular time period), it simply requests the HDR radio network to maintain the IP session and provides the forwarding IP address.

If the access terminal moves from the HDR boundary, the session with the HDR radio network will be lost. However, it is typically preferable for the access terminal to retain the first IP address (a.b.c.d). This can be achieved in various manners. For a Mobile IP service defined by the Wireless IP standard, the access terminal can be re-assigned the first IP address by performing a Mobile Node Registration. And for a Simple IP service defined by the Wireless IP standard, the access terminal can request assignment of the first IP address for use during IPCP. Since the access terminal is able to authenticate its NAI (Network Access Identifier) using CHAP (Challenge Handshake Authentication Protocol) and since it was previously assigned the first IP address (a.b.c.d) for the same NAI, the PDSN can again assign the first IP address to the access terminal.

The access terminal may be assigned two IP addresses for two PPP sessions with the PDSN. Typically, the service providers operate the radio networks behind NAT (network address translation) elements and have an (arbitrarily) large number of IP addresses that can be assigned to the access terminals. The NAT elements can be used to map an arbitrary locally routable IP address to an available globally unique IP address. With the NAT elements, a (relatively) small number of globally unique IP addresses can be used to support a (relatively) large number of access terminals since only a portion of the access terminals are typically active at any given moment.

IP addresses can also be conserved by various schemes whether or not NAT elements are employed. In one scheme, the RADIUS server and the PDSN can be configured to assign a locally routable IP address as the forwarding address. When an access terminal requests a dynamic IP address (e.g., via an IPCP C-Req of 0.0.0.0), the PDSN can determine whether an IP address is already allocated for the NAI associated with the access terminal. If an IP address has already been assigned, then the PDSN can recognize that the access terminal is only requesting a forwarding address and can allocate a locally routable IP address.

For simplicity, the invention has been specifically described for the maintenance of an IP session established via the HDR radio network while the access terminal is not tuned to this radio network. However, the invention can be applied to other radio networks that may conform to any standard, including those radio networks and standards identified above.

Figure 6:
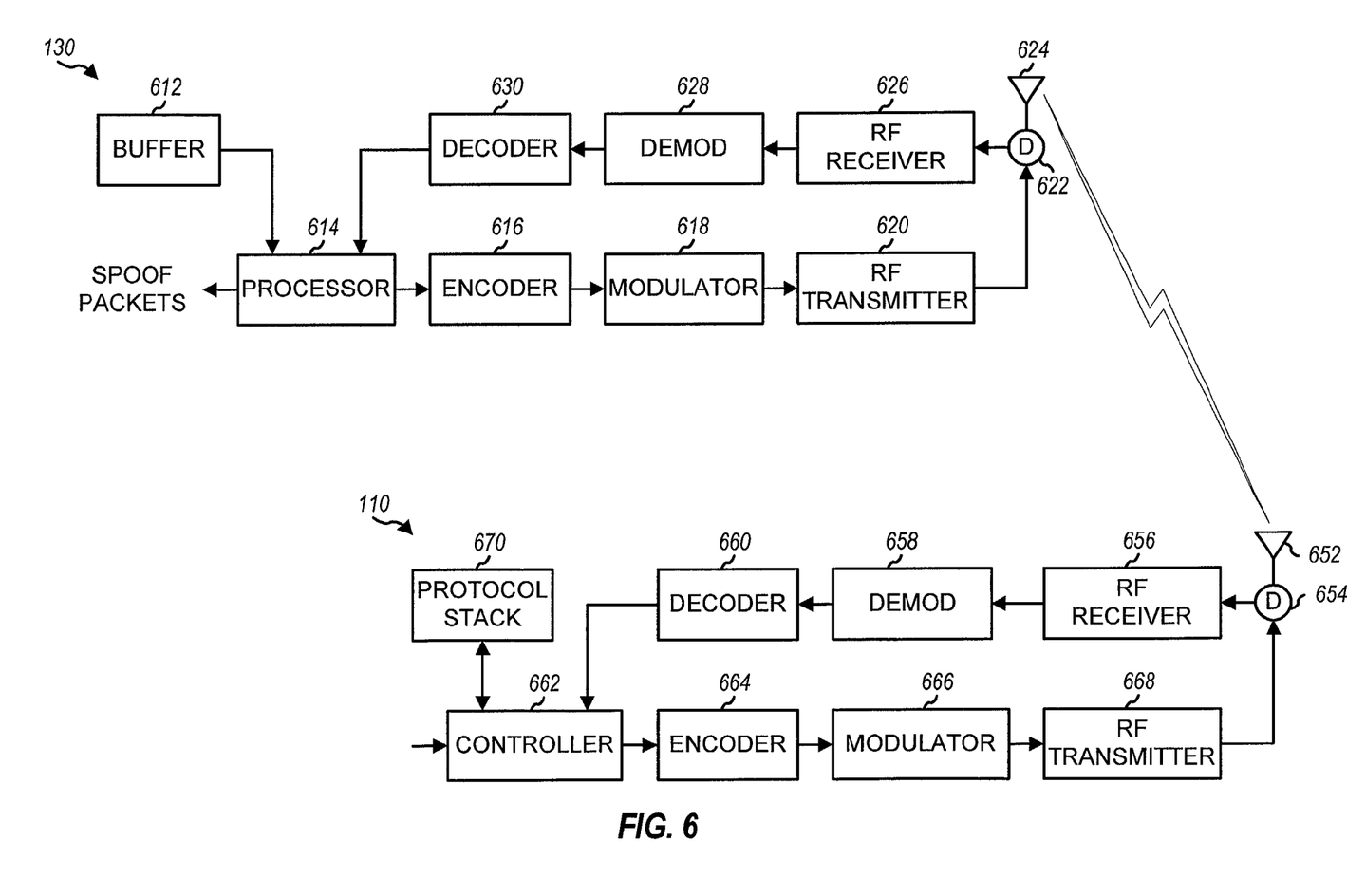
FIG. 6 is a simplified block diagram of a specific embodiment of the access terminal and access point.

FIG. 6 is a simplified block diagram of a specific embodiment of access terminal 110 and access point 130. At access terminal 110, a request to maintain the IP session established via the HDR radio network is provided to, or generated by, a controller 662, which also receives the forwarding IP address from a protocol stack 670. Controller 662 then generates a message that includes the request and the forwarding IP address. The message is sent to an encoder 664 that codes the message with one or more coding schemes. The coding schemes may include, for example, cyclic redundancy check (CRC) coding, Turbo coding, convolutional coding, serial-concatenated coding, Reed-Solomon block coding, no coding, and so on, which are typically used for CDMA-based systems.

The coded data is provided to a modulator 666 that further processes the coded data. For CDMA-based systems, modulator 666 may perform Walsh covering, pseudo-noise (PN) spreading, scrambling, and so on. The processed data is then converted into one or more analog signals. A transmitter 668 receives and modulates the analog signals with a particular modulation scheme (e.g., quadrature phase shift keying (QPSK), quadrature amplitude modulation (QAM), or some other scheme), and further filters and amplifies the signal. The modulated signal is routed through a duplexer (D) 654 and transmitted over-the-air via an antenna 652.

At access point 130, the transmitted signal is received by an antenna 624, routed through a duplexer (D) 622, and provided to a receiver 626. Receiver 626 conditions, (quadrature) demodulates, and digitizes the received signal and provides samples to a demodulator 628. The signal conditioning may include filtering, amplification, frequency conversion, and so on, and the (quadrature) demodulation is complementary to that performed at access terminal 110.

Demodulator 628 then processes the samples in a manner that is complementary to that performed at access terminal 110 (e.g., despreading, descrambling, and decovering) to provide symbols. A decoder 630 receives and decodes the symbols with one or more decoding schemes that are complementary to the coding scheme(s) used at access terminal 110. The decoded data is then provided to a processor 614.

Transmission of traffic data and messages (e.g., IP packets) from access point 130 to access terminal 110 occurs via a complementary signal path. The data is coded by an encoder 616, modulated by a modulator 618, conditioned by a transmitter 620, routed through duplexer 622, and transmitted via antenna 624. At access terminal 110, the transmitted signal is received by antenna 652, routed through duplexer 654, conditioned by an RF receiver 656, processed by a demodulator 658, decoded by a decoder 660, and provided to controller 662.

As used herein, a forward transmission refers to a transmission from access point 130 to access terminal 110, and a reverse transmission refers to a transmission from access terminal 110 to access point 130. The processing and decoding formats on the reverse path can be, and is typically, different from those of the forward path.

In the embodiment shown in FIG. 6, access terminal 110 includes protocol stack 670 that is used to maintain information indicative of the established sessions (e.g., the protocol states of each session established by the access terminal). Protocol stack 670 can be used to maintain the stack for the protocol reference models shown in FIG. 4A or 4B, and can support two (or more) IP addresses assigned via multiple (e.g., HDR and CDMA) radio networks. Controller 662, with the assistance of the information stored in protocol stack 670, is able to determine the particular radio network with which the access terminal is currently tuned to and the proper protocol stack to apply. Protocol stack 670 can be implemented with a memory unit (e.g., RAM, Flash, or some other memory devices) separate from, or located within, controller 662 (e.g., in an embedded memory).

In FIG. 6, encoder 616, modulator 618, and transmitter 620 form a transmitter unit for access point 130, and receiver 626, demodulator 628, and decoder 630 form a receiver unit for access point 130. Similarly, encoder 664, modulator 666, and transmitter 668 form a transmitter unit for access terminal 110, and receiver 656, demodulator 658, and decoder 660 form a receiver unit for access terminal 110. CDMA BTS 132 can be implemented similar to access point 130 in FIG. 6.

The elements of access terminal 110, access point 130, and BTS 132 can be implemented in various manners. For example, these elements can be implemented using one or more application specific integrated circuits (ASICs), digital signal processors (DSPs), micro-controllers, microprocessors, other electronic circuits designed to perform the functions described herein, or a combination thereof. Also, some of the functions described herein can be implemented with a general-purpose processor or a specially designed processor operated to execute instruction codes that achieve the functions described herein. Thus, the elements of the access terminal, access point, and BTS described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. A method for maintaining an Internet Protocol (IP) session for an access terminal at a first radio network, the method comprising:
    establishing the IP session for the access terminal with a network element via the first radio network;
    receiving a request to maintain the IP session if the access terminal is not tuned to the first radio network;
    receiving a forwarding address for the access terminal via the first radio network;
    receiving an indication that the access terminal is not tuned to the first radio network;
    receiving a first packet for the access terminal via the first radio network;
    sending a second packet in response to reception of the first packet, wherein the second packet is addressed to the access terminal using die forwarding address;
    establishing a connection with the access terminal via the first radio network; and
    sending the first packet to the access terminal via the first radio network.

2. The method of claim 1, wherein the access terminal is assigned a first address for the IP session established via the first radio network.

3. The method of claim 2, wherein the first packet is received from the network element and addressed to the access terminal using the first address.

4. The method of claim 1, wherein the second packet is sent to the network element.

5. The method of claim 1, wherein the indication that the access terminal is not tuned to the first radio network is received via a message sent by the access terminal.

6. The method of claim 1, wherein the indication that the access terminal is not tuned to the first radio network is acknowledged by receipt of an indication that the access terminal has dropped traffic channel assigned to the access terminal by the first radio network.

7. The method of claim 1, further comprising:
receiving an indication of a particular time period to maintain the IP session; and
maintaining the IP session for the particular time period.

8. The method of claim 1, further comprising:
periodically receiving a request to keep alive the IP session.

9. The method of claim 1, wherein the second packet indicates that the first radio network has data for the access terminal.

10. The method of claim 2, wherein the first address is a globally routable IP address.

11. The method of claim 1, wherein the forwarding address is a locally routable IP address.

12. The method of claim 1, wherein the network element is a packet data serving node (PDSN).

13. A method for maintaining an Internet Protocol (IP) session for an access terminal at a first radio network, the method comprising:
establishing the IP session for the access terminal with a network element via the first radio network, wherein the access terminal is assigned a first address for the IP session;
receiving a request to maintain the IP session if the access terminal is not tuned to the first radio network via the first radio network;
receiving a forwarding address for the access terminal via the first radio network;
receiving an indication that the access terminal is not tuned to the first radio network;
receiving a first packet from the network element and addressed to the access terminal using the first address;
sending a second packet to the network element in response to reception of the first packet, wherein the second packet is addressed to the access terminal using the forwarding address and indicates that the first radio network has data for the access terminal;
establishing a connection with the access terminal via the first radio network; and
sending the first packet to the access terminal via the first radio network.

14. A method for maintaining an Internet Protocol (IP) session for an access terminal at a first radio network, the method comprising:
establishing the IP session with a network element via the first radio network,
establishing a second session with a second radio network;
sending to the first radio network a request to maintain the IP session if not tuned to the first radio network;
sending a forwarding address to the first radio network;
receiving a communication from the second radio network;
establishing a connection with the first radio network in response to the received communication; and
receiving a packet from the first radio network.

15. The method of claim 14, wherein the communication received from the second radio network is a page.

16. The method of claim 14, further comprising:
receiving an assignment of a first address for the IP session.

17. The method of claim 16, further comprising:
requesting for assignment of the first address for the IP session, and
wherein the first address is assigned in response to the request.

18. The method of claim 16, wherein the first address is associated with an identifier assigned to the access terminal by the first radio network.

19. The method of claim 18, wherein the identifier is a Unicast Access Terminal Identifier (UATI).

20. The method of claim 16, wherein the packet received from the first radio network includes the first address as a destination address.

21. The method of claim 14, further comprising:
receiving an assignment of a second address for the second session established via the second radio network, and
wherein the second address is sent to the first radio network as the forwarding address.

22. The method of claim 21, wherein the second address is associated with an International Mobile Station Identification (IMSI) assigned to the access terminal.

23. The method of claim 14, further comprising:
maintaining a protocol stack for the IP session and the second session.

24. The method of claim 23, wherein the protocol stack include addresses assigned for the IP and second sessions established via the first and second radio networks, respectively.

25. The method of claim 14, further comprising:
maintaining identity of a particular radio network to which the access terminal is currently tuned.

26. The method of claim 15, further comprising:
sending an acknowledgement to the second radio network in response to reception of the page.

27. The method of claim 14, wherein the first radio network is a High Data Rate (HDR) radio network.

28. The method of claim 14, wherein the second radio network is a CDMA radio network.

29. A method for maintaining an Internet Protocol (IP) session for an access terminal at a first radio network, the method comprising:
establishing the IP session with a network element via the first radio network;
receiving an assignment of a first address for the IP session;
establishing a second session with a second radio network;
receiving an assignment of a second address for the second session;
maintaining a protocol stack for the IP and second sessions, wherein the protocol stack includes the first and second addresses to be used for the IP and second sessions established via the first and second radio networks, respectively;
sending to the first radio network a request to maintain the IP session if not tuned to the first radio network;
sending the second address as a forwarding address to the first radio network;

receiving a page from the second radio network;
establishing a connection with the first radio network in response to the received page; and
receiving a packet from the first radio network.

30. An access terminal comprising:
a transmitter unit operative to receive and code data and messages, modulate the coded data, and convert the modulated data into a first modulated signal suitable for transmission over a transmission medium;
a receiver unit operative to receive a second modulated signal, demodulate the received signal to provide demodulated data, and decode the demodulated data to recover transmitted data and messages; and
a controller coupled to the transmitter and receiver units and operative to direct
  establishment of an IP session with a network element via a first radio network,
  establishment of a second session with a second radio network,
  transmission to the first radio network a request to maintain the IP session while not tuned to the first radio network,
  transmission of a forwarding address to the first radio network,
  reception of a communication from the second radio network,
  establishment of a connection with the first radio network in response to the received communication from the second radio network, and
  reception of a packet from the first radio network.

31. The access terminal of claim 30, further comprising:
a protocol stack configured to store information for the IP and second sessions established via the first and second radio networks, respectively, and wherein the stored information includes addresses to be used for the IP and second sessions.

32. An access point in a first radio network, comprising:
a transmitter unit operative to receive and code data and messages, modulate the coded data, and convert the modulated data into a first modulated signal suitable for transmission over a transmission medium;
a receiver unit operative to receive a second modulated signal, demodulated the received signal to generate demodulated data, and decode the demodulated data to recover transmitted data and messages; and
a processor coupled to the transmitter and receiver units and configured to direct
  establishment of an IP session for an access terminal with a network element,
  reception of a request to maintain the IP session if the access terminal is not tuned to the first radio network,
  reception of a forwarding address for the access terminal via the first radio network,
  reception of an indication that the access terminal is not tuned to the first radio network,
  reception of a first packet for the access terminal via the first radio network,
  transmission of a second packet in response to reception of the first packet, wherein the second packet is addressed to the access terminal using the forwarding address and indicates that the first radio network has data for the access terminal,
  establishment of a connection with the access terminal via the first radio network, and
transmission of the first packet to the access terminal via the first radio network.

* * * * *